UNITED STATES PATENT OFFICE.

JACOB H. REES, OF HAWTHORN, TENNESSEE.

IMPROVEMENT IN HOG-CHOLERA COMPOUNDS.

Specification forming part of Letters Patent No. 202,583, dated April 16, 1878; application filed February 28, 1878.

*To all whom it may concern:*

Be it known that I, JACOB H. REES, of Hawthorn, in the county of Bedford and State of Tennessee, have invented certain new and useful Improvements in Hog-Cholera Preventive; and I do hereby declare that the following is a full, clear, and exact description thereof, which will enable others skilled in the art to which it appertains to make and use the same.

The nature of my invention consists in a medical compound for the cure of hog-cholera, as will be hereinafter more fully set forth.

My medical compound is composed of the following ingredients, in about the following proportions, viz: one gallon of turpentine; one gallon of soap; one pound soda; one quart sirup of blackberry-brier root; one quart molasses; one quart vinegar; one hundred drops of musk; one quart coal-oil; one pint linseed-oil.

These ingredients are all well and thoroughly mixed and stirred together, and make a sufficient quantity to mix in with, say, about five bushels of meal or other feed for one meal for one hundred hogs. It may, however, be given as often and in such quantities, mixed with the feed, as the occasion may demand.

This compound I have found by experience will not only act as a preventive, but also as a cure for hog-cholera.

I do not confine myself to the precise proportions of the ingredients mentioned, as they may be varied according as the compound is to be used as a preventive or as a cure for hog-cholera.

Having thus fully described my invention, what I claim as new, and desire to secure by Letters Patent, is—

The within-described medical compound consisting of turpentine, soap, soda, sirup of blackberry-brier root, molasses, vinegar, musk, coal-oil, and linseed-oil, substantially as and for the purposes herein set forth.

In testimony that I claim the foregoing as my own I have hereto affixed my signature in presence of two witnesses.

JACOB H. REES.

Witnesses:
WM. B. UPPERMAN,
P. C. DIETERICH.